(12) United States Patent
Priescu et al.

(10) Patent No.: US 10,089,145 B1
(45) Date of Patent: Oct. 2, 2018

(54) APPROXIMATING SEQUENTIAL WORKLOADS ON RESOURCE CONSTRAINED SYSTEMS

(71) Applicant: Amazon Technologies, Inc., Seattle, WA (US)

(72) Inventors: Valentin Priescu, Seattle, WA (US); James Michael Thompson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 41 days.

(21) Appl. No.: 14/980,687

(22) Filed: Dec. 28, 2015

(51) Int. Cl.
*G06F 9/50* (2006.01)

(52) U.S. Cl.
CPC ........................ *G06F 9/50* (2013.01)

(58) Field of Classification Search
CPC .......................................... G06F 9/50
See application file for complete search history.

(56) References Cited

U.S. PATENT DOCUMENTS

| | | | | |
|---|---|---|---|---|
| 5,819,047 A * | 10/1998 | Bauer | ................... | G06F 9/5011 709/217 |
| 2009/0010165 A1* | 1/2009 | Kim | ........................ | H04L 47/10 370/235 |
| 2012/0290537 A1* | 11/2012 | Smith | ................... | G06F 3/0608 707/654 |
| 2014/0059551 A1* | 2/2014 | Umanesan | ............ | H04L 67/325 718/102 |
| 2014/0289357 A1* | 9/2014 | Staudenmaier | ....... | G06F 9/5083 709/213 |
| 2014/0351450 A1* | 11/2014 | Lamouchi | ............... | H04L 47/29 709/230 |
| 2015/0358402 A1* | 12/2015 | Stolyar | ................. | H04L 47/125 709/226 |

OTHER PUBLICATIONS

ECS Elastic CLoud Storage, EMC, Jun. 2015.*

* cited by examiner

*Primary Examiner* — Charlie Sun
(74) *Attorney, Agent, or Firm* — Davis Wright Tremaine LLP

(57) ABSTRACT

Data storage services may provide customers with access to computing resources of data storage server and throttling methods may be used manage the computing resources of the data storage service in order to ensure that the customers do not overload the data storage servers. Tokens may represent I/O operations executed by the customer of the data storage service. When I/O request are received the data storage service may determine if the I/O request is a member of a sequence and remove a reduced number for tokens from the work token bucket as a result. The data storage server may determine the I/O request is a member of a sequence based at least in part on a logical chunk of a storage volume the I/O request maps to.

19 Claims, 10 Drawing Sheets

APPROXIMATING SEQUENTIAL WORKLOADS ON RESOURCE CONSTRAINED SYSTEMS

BACKGROUND

Several leading technology organizations are investing in building technologies that provide customers with access to computing resources. Such services provide access to computing and/or storage resources (e.g., storage devices providing either a block-level device interface, or a web service interface) to customers or subscribers. Within multi-tier ecommerce systems, combinations of different types of resources may be allocated to customers and/or their applications, such as whole physical or virtual machines, CPUs, memory, network bandwidth, or I/O capacity. Block-level storage devices implemented at storage service may be made accessible, for example, from one or more physical or virtual machines implemented by another service.

Computer systems that provide services to customers may employ various techniques to protect the computer systems from a number of service requests that could potentially overload the computer systems. In general, a computer system is considered to be in an "overloaded" state if it is not able to provide the expected quality of service for at least some portion of customer requests it receives. Common solutions applied in connection with overloaded computer systems include denying service to customers or throttling a certain number of incoming requests until the computer systems leave an overloaded state. Such techniques may for example be employed at storage servers in some embodiments on a per-storage-device level.

Some current computer systems avoid an overload scenario by comparing the request rate with a fixed global threshold and selectively refusing service to customers once this threshold has been crossed. However, it is difficult to define a single global threshold that is meaningful (much less that provides acceptable performance) in a computer system that receives different types of requests at varying, unpredictable rates, and for which the amount of work required to satisfy the requests is also varying and unpredictable in at least some cases. While many services may have been designed to work best when client requests are uniformly distributed over time, in practice such temporal uniformity in work distribution is rarely encountered. Computing resource service providers that wish to achieve and retain high levels of customer satisfaction may need to implement techniques that deal with temporal and spatial workload variations in a more sophisticated manner.

BRIEF DESCRIPTION OF THE DRAWINGS

Various techniques will be described with reference to the drawings, in which.

DETAILED DESCRIPTION

Figure 1:
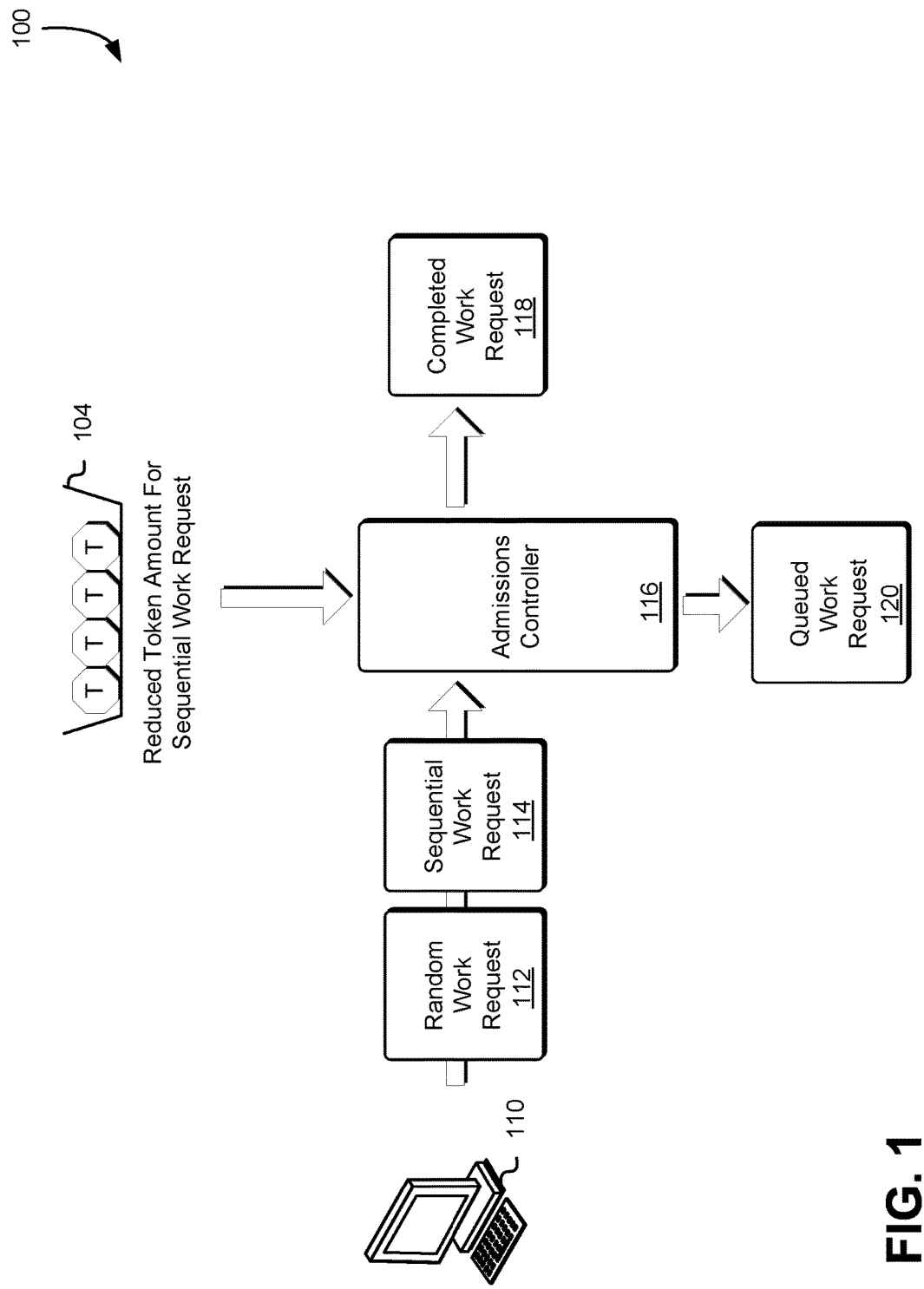
FIG. 1 illustrates aspects of an admissions control mechanism that detects sequential work requests in accordance with at least one embodiment.

In various examples described below, a data storage service may be provided by a computing resource service provider, and the data storage service may use one or more network attached storage devices, such as block-level storage devices, to provide data storage for customers of the computing resource service provider. To reduce the cost of the computing resources, such as the block-level storage devices, provided to the customers of the computing resource service provider, computer systems providing the customers with access to the computing resources may be monitored and utilization of the computing resources may be limited. This may also include offering more of the computing resource to customers than there is actually physical capacity for on the computer systems providing the computing resources to the customers. In general, a customer may not consume the entire portion of the computer systems resources allocated to the customer. This mechanism may enable the computing resource service provider to increase efficiency and reduce the amount of un-utilized or under-utilized computing resources made available to customers. When computing resources of the computer system are oversubscribed, the computer system may become overloaded when multiple customers attempt to consume the entire portions of their allotted computing resources at or near the same time. Throttling techniques described herein may be used to prevent the computer system from being overloaded while enabling the customers to continue to receive a high level of performance.

For example, the data storage service may provide the customers with access to block-level storage devices allowing the customer a certain number of Input/Output Operations per Second (IOPS). Furthermore, the data storage service may charge a reduced number of requests for sequential access operations. Sequential operations may be more efficient and/or easier to process for the block-level storage devices of the data storage services and as a result the computing resource service provider may incentivize customers to provide sequential requests. For example, by allowing an increased number of IOPS for sequential work requests by removing a single token for a certain number of sequential Input/Output (I/O) operations. The number of I/O operations for which a single token is consumed may be determined based at least in part on a maximum merge size and a total length of the sequential I/O operations. A token bucket model may allocate customers a certain number of tokens. Each token may represent an "I/O credit" that may be used by the customer to perform one read or one write operation. For example, a token may be removed from a token bucket associated with a particular customer for each I/O operation requested by the customer and performed by the data storage service. Additionally, the tokens may correspond to a particular size I/O operation. For example, a token may correspond to a 4 Kb I/O operation. In this example, one read or write operation may be a 4 Kb I/O operation. Therefore, if the customer submits a request specifying a 16 Kb I/O operation, processing the request may require 4 tokens. However, if the request is directed to sequential I/O operations, the data storage service may merge the sequential operations and only charge 1 token for processing the request. Furthermore, I/O operations may be considered sequential I/O operations if the I/O operations map or are otherwise associated with the same chunk information, described in greater detail below.

The data storage service may utilize chunk information to determine if two or more requests contain sequential I/O request. The data storage service may logically split the volume into chunks equal to or greater than the I/O size for which the data storage service will merge. Returning to the example above, if the merge size credit by the data storage service is 16 Kb then the chunks size is set to 16 Kb and the volume is split into 16 Kb logical chunks. When two or more 4 Kb I/O operations are received, they may be considered sequential if they map or are otherwise associated with the same chunk. Furthermore, the chunk information may better track I/O operations because I/O operations may be split and/or reordered by various computer systems and networks, such as operation system kernels and routers. In one example, this determination is made at the storage server responsible for processing the I/O operation.

The storage server, when initializing the customer volume, may determine the chunks, for example, by dividing the total volume size by the chunk size. In addition, the storage server may determine a bit mask to more efficiently determine a particular chunk associated with a request. In another example, the storage server may track multiple I/O streams and credit sequential I/O operations for each I/O stream. The I/O operations may include an offset that is used to determine the chunk associated with the I/O operations. For example, if a particular customer volume is 32 Kb, the chunk size (e.g., the maximum size of sequential I/O operations the data storage server will merge) is 16 Kb, and the I/O size is 1 Kb then there will be two logical chunks from offset 0-15 and 16-32. When an I/O operation is received the storage server may divide the offset by the chunk size or apply a bit mask to determine the chunk associated with the I/O operation. In one example, if the determined chunk matches the previous chunk determined from the previous I/O operation, the storage service may merge the I/O operations. This process may continue until the maximum merge size is reached. The storage server may remove a token from the customer's token bucket upon receiving the first I/O operations or after the maximum number of I/O operations have been merged.

In the preceding and following description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

FIG. 1 illustrates an environment 100 in which an admissions control mechanism detects sequential workloads and determines a reduced number of tokens to consume for sequential workloads compared to a number of tokens consumed for random workloads in accordance with at least one embodiment. Generally speaking, such mechanisms may be used for workload management of various types of activities, such as storage objects, database tables, database partitions, and other workloads that include the partitioning and/or allocation of computing resources. In the context of a block storage service, a set or bucket of tokens may be maintained for various volumes or volume partitions by one or more admissions controllers 116, at either an instance host, storage server, centralized server, or combination thereof. For example, the admissions controller 116 may be a set of computer instructions or other logic configured to maintain state information corresponding to the storage server in a memory of the storage server or component thereof such as an on-board processor described in greater detail below. Furthermore, for the purposes of the present disclosure, in various embodiments when the admissions controller 116 includes the set of computer instructions or other logic, performance of an operation by the admissions controller 116 causes the underlying computer system executing the set of computer instructions or other logic to perform the operation. The admissions controller 116 may also be implemented by specialized hardware, such as a processor configured to perform the operations of the admissions controller 116. The state information including a mechanism that uses a work token bucket 104 of tokens is illustrated in FIG. 1 for simplicity of presentation; however, combinations of multiple work token buckets may be used in some embodiments, such as one bucket for read operations and a different bucket for write operations.

The work token bucket 104 (e.g., a logical container which may be implemented as a data structure within a software program) may be set up for admissions control purposes associated with a particular storage server or entity of the storage server, such as a block-level storage device (e.g., a volume, or a portion of a volume). Furthermore, the work token bucket 104 may be populated with an initial set of tokens during bucket initialization, volume initialization, server initialization, or a combination thereof. The initial population may be determined, e.g., based on expectations of the workload, service level agreements, a provisioning budget specified by the client that owns or manages the corresponding data object, or some combination of such factors in various embodiments. For some types of buckets the initial population may be set to zero in some embodiments. In some implementations the initial population of a bucket may be set to a maximum population for which the bucket is configured. The work token bucket 104 may be populated with a number of tokens equal to the maximum capacity of the storage server. During initialization of the work token bucket 104, the admissions controller 116 or other component of the storage server may determine chunk information associated with a logical volume and corresponding the work token bucket. For example, the admissions controller 116 may determine a number of chunks and chunk identification information associated with the logical volume and a mapping of work request to particular chunks.

In addition, the admissions controller 116 may remove tokens from the work token bucket 104 upon receipt of a work request such as a random work request 112 or sequential work request 114. In some embodiments, the admissions controller 116 removes the reduced number of tokens from the work token bucket 104 after determining a particular workload has reached the maximum merger size (e.g., the maximum I/O request size the storage service will merge for the purposes of determining a reduced token amount). Random work requests 112 may include a set of requests for information from disparate sectors of a block-level storage device that are not members of a sequence or other pattern, for example, sectors 43, 5, 249, 32, and 122 of a particular volume. Fulfillment of a single work request may involve access to one or more sectors and may be considered random relative to one or more other work requests in the set of requests. For example, the set of requests may include a number of requests in a queue maintained by the block-level storage device. In various embodiments a particular work request is considered a random work request 112 if a certain amount of seek time is required for a disk platter of the block-level storage device to rotate to locate the appropriate sector. However, if the sector accessed by the next work request is located directly after the previous one on the same track of the block-level storage device, the disk head may encounter it immediately afterwards, incurring no wait time (e.g., no seek time) and therefore the work request may be considered sequential relative to the previous work requests. For example, sequential work requests 114 may include a set of requests for information from disparate sectors of a block-level storage device that are members of a sequence or other pattern, for example, sectors 4, 5, 6, 7, and 8 even if one or more request of the set of requests associated are received out of order. For example, the request may be contained in a queue, however, the request may be written to the queue out or order but when taken as a whole indicate a pattern and are therefore sequential.

When an indication of a work request (such as a read request or a write request in the case of a storage object or database object) is received at an admissions controller 116, the admissions controller 116 may attempt to determine whether some number N of tokens (where N may be greater than or equal to 0, depending on implementation or on configuration parameters) are present in the work token bucket 104. If that number of tokens is available in the work token bucket 104, the work 114 may be accepted or admitted for execution immediately, and a number of tokens may be determined and consumed or removed from the work token bucket 104. Otherwise, if N tokens are not present, the acceptance of the work request 114 may be deferred until sufficient tokens become available in the depicted embodiment. In the illustrated scenario, work request 118 has been accepted and completed, a queued work request 120 has been deferred and queued, and other work requests (random work request 112 and sequential work request 114) are yet to be considered by the admissions controller 116. The storage server may maintain a queue of queued work requests 120. For example, the storage server may maintain a queue of 32 work requests as queued work requests 120.

The deferred work requests may eventually be accepted, when sufficient tokens eventually become available in the work token bucket 104. In some embodiments, if a particular work request does not get accepted within some timeout window, it may be rejected by the admissions controller. Rejected work requests may be resubmitted or retried in some implementations. In at least some embodiments, if sufficient tokens are not available in the work token bucket 104, when the work request is processed by the admissions controller 116, the work request may be rejected immediately instead of being deferred.

In some embodiments, the work token bucket 104 is refilled or repopulated with tokens over time, e.g., based on configuration parameters, such as a refill rate associated with the bucket. In some implementations, token refill operations may accompany, or be performed in close time proximity to, consumption operations (e.g., within a single software routine, N tokens may be consumed for admitting a request, and M tokens may be added based on the refill rate and the time elapsed since the bucket was last refilled). Refill rates or token counts of a given work token bucket 104 may be modified by client-side components of a storage service, e.g., to allow higher work request rates to be handled. Limits may be placed on the maximum or minimum number of tokens the work token bucket 104 may hold, e.g., using configuration parameters. Using various combinations of configuration parameter settings, fairly sophisticated admissions control schemes may be implemented in different embodiments in connecting with the detection of sequential workload described herein.

In one simple example scenario, the work token bucket 104 may be configured with an initial population of 100 tokens, a maximum allowable population of 100 tokens and a minimum of zero tokens; N may be set to 1, and the refill rate may be set to 100 tokens per second, and one token may be added for refill purposes (assuming the maximum population limit is not exceeded) once every 10 milliseconds. As depicted in FIG. 1, when the sequential work requests 114 arrive, a reduced number of tokens may be consumed for the sequential work requests 114 as a result of the admissions controller determining that the sequential work requests 114 map or are otherwise associated with the same chunk as the completed work request 118.

Figure 2:
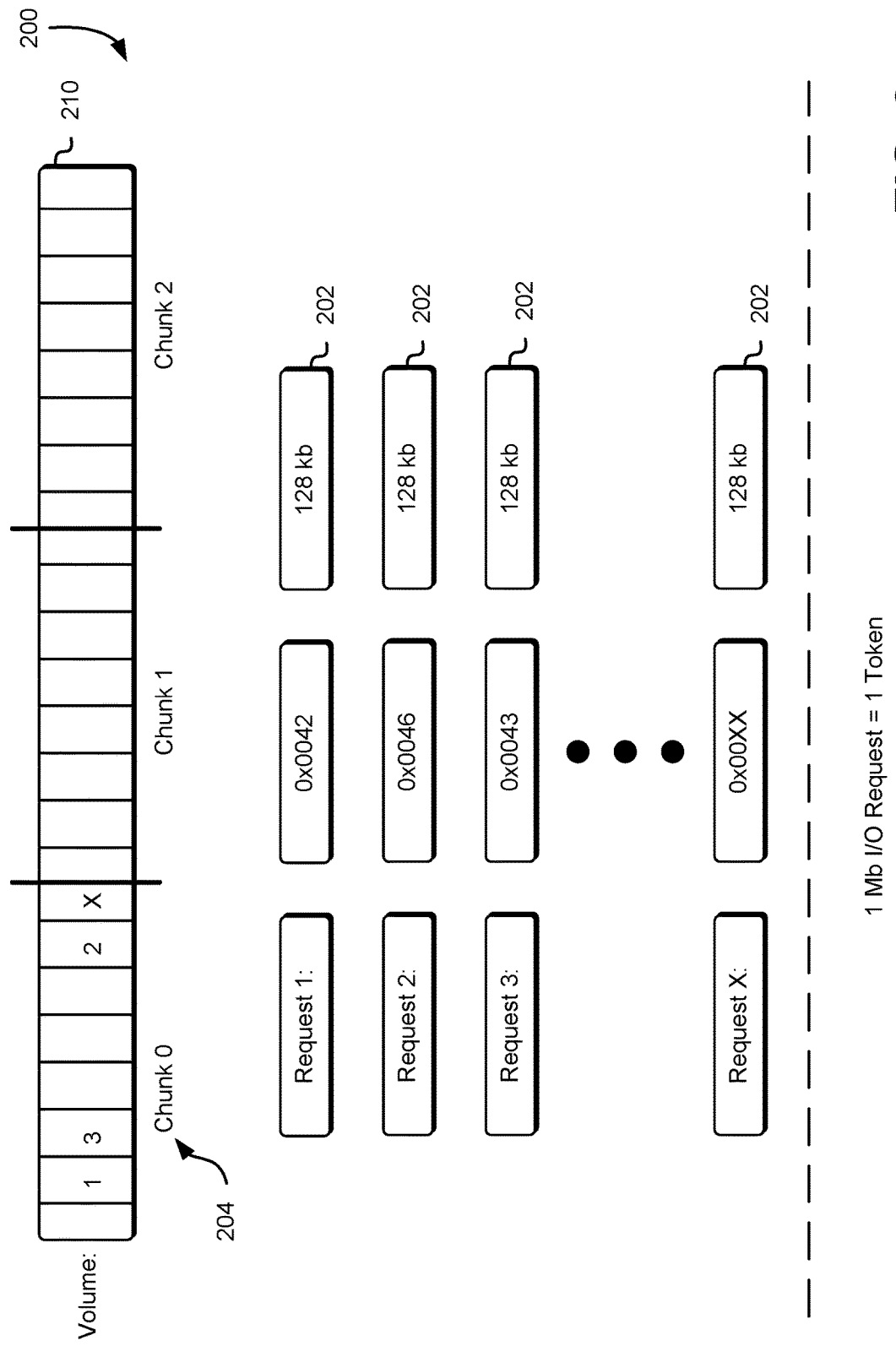
FIG. 2 illustrates aspects of detecting sequential work requests based at least in part on chunk information in accordance with at least one embodiment.

FIG. 2 illustrates an environment 200 in which an admissions controller may determine one or more chunks 204 associated with a volume 210 and detect a set of sequential work requests corresponding to the volume 210 for which a reduced number of tokens may be consumed in accordance with at least one embodiment. The volume 210 may be a logical volume or physical volume of a block-level storage device or other suitable storage device. In addition, the volume may have a total size which may be equal to or less than the total size of the block-level storage device or other suitable storage device. The block-level storage device or other suitable storage device may be a component of a storage server or other computer system described in greater detail below.

As illustrated in FIG. 2, the volume 210 may receive some number of work requests 202, shown as request 1 through request X. The requests may include I/O operations or other work requests as described above in connection with FIG. 1. The work requests 202 may correspond to I/O operations (e.g., read or write operations) for a particular sector and/or offset of the volume 210. In order to determine if the work requests 202 are sequential, the volume 210 may be divided into a plurality of chunks 204. The chunks 204 may be determined based at least in part on the maximum size and/or number of work requests 202 that may be merged in order to consume a reduced number of tokens. In the example illustrated in FIG. 2 the maximum merger size for one token is 1 megabyte (Mb); as a result the chunk size is 1 Mb and the volume 210 is divided into some number of 1 Mb chunks 204.

Therefore, work requests 202 for the volume 210 may be submitted to a data storage server or other interface responsible for providing work requests 202 to the volume for processing in sizes of 1 Mb in order to maximize efficiency (e.g., maximizing the work request 202 size per token).

However, as described above, work requests 202 may be split or otherwise divided for a variety of reason. For example, the work requests 202 may be split to enable the work requests 202 to travel across various networks. In another example, an operating system or component thereof, such as a virtual disk controller, may split the work requests 202 because the operating system does not support work requests 202 of 1 Mb. It should be noted, that although the maximum merge size and the chunk size described in connection with FIG. 2 is 1 Mb any value size greater than zero may be used in connection with the present disclosure. In addition, the maximum merge size, the chunk size, and the size of the work requests 202 may be modified independently of each other. For example, the chunk size may be modified in order to increase the accuracy of the approximation of sequential work requests 202.

Returning to FIG. 2, the work requests 202 may include an offset and a size as described above. When a work request 202 is received the offset may be divided by the chunk size and the resulting value may indicate the chunk. As illustrated in FIG. 2, 'request 1' maps to 'chunk 0' as a result of the offset (0x0042) when divided by the chunk size (1 Mb) equals 0. In addition, the work request 202 includes a size (e.g., 128 Kb as illustrated in FIG. 2), which may be added to a tracking value utilized by the storage server to determine if the maximum merge size has been reached. For example, when the storage server determines that a particular work request is sequential relative to a previously processed work request 202, the storage server may add the size to the current tracking value and determine if the maximum merge size has been reached. In some embodiments, when adding the size to the current tracking value the maximum merge size is exceed, in these situations throttling operations may be performed an the current tracking value may be set to an amount the maximum merge size was exceed. For example, if the size of the of the work request 202 is 32 Kb, the current tracking value is 120 KB, and the maximum merge size is 128 Kb, the size (32 Kb) plus the current tracking value (120 Kb) exceeds the maximum merge size (128 Kb). As a result, the storage server may determine the maximum number of work requests 202 have been merged, perform throttling operations (e.g., if not previously performed), reset the current tracking value, and add or set the remaining size (24 Kb) to the current tracking value. In order to determine if the particular work request is sequential the storage server may maintain chunk information indicating the previous chunk hit by one or more previously processed work requests 202.

Figure 3:
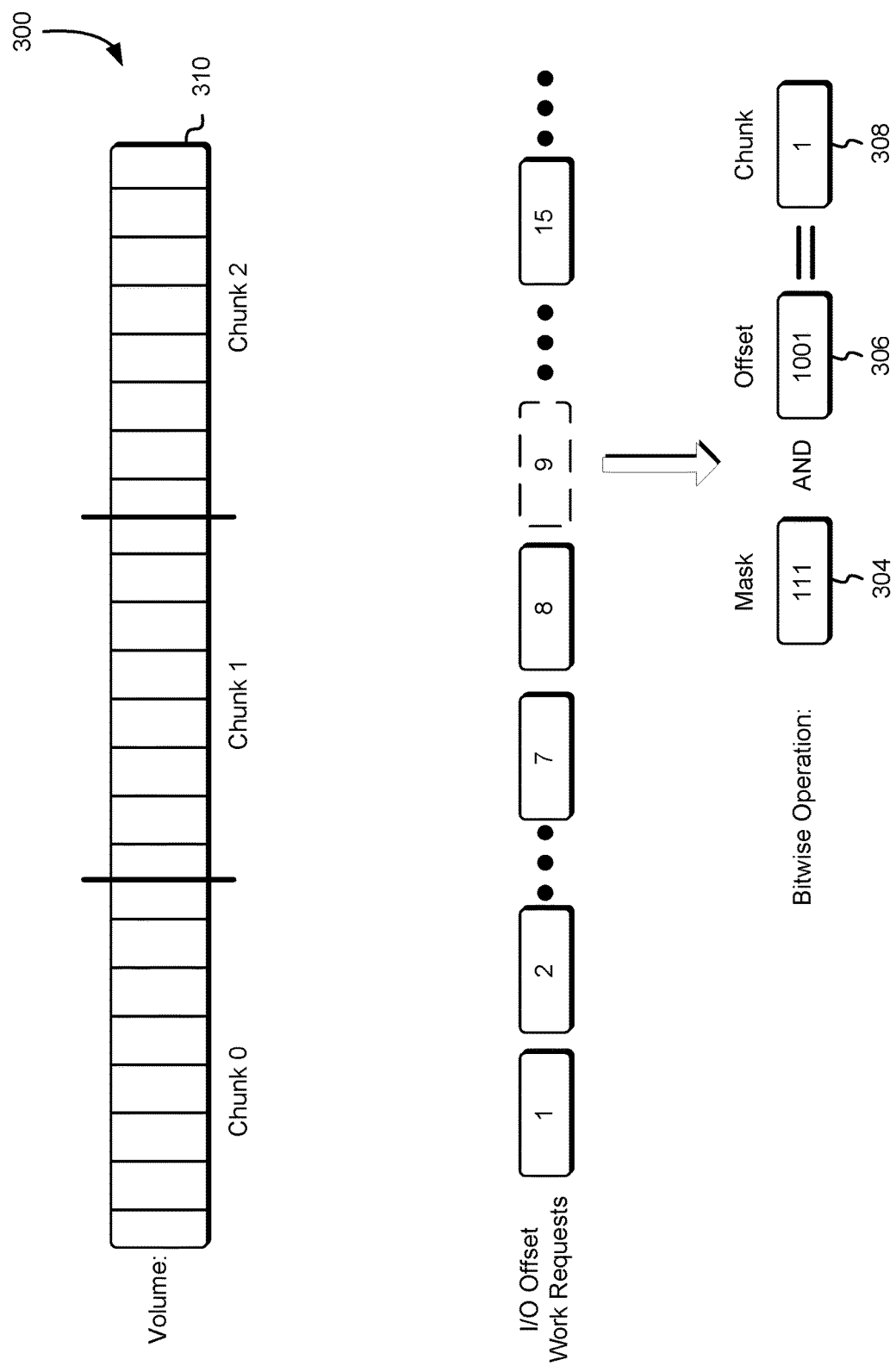
FIG. 3 illustrates aspects of detecting sequential work requests based at least in part on chunk information in accordance with at least one embodiment.

FIG. 3 illustrates an environment 300 in which an admissions controller may determine a particular chunk associated with a work request based at least in part on a bit mask 304. The bit mask 304 may be a value or other data that may be used for bitwise operations, particularly in a bit field. The bit mask 304 may mask or otherwise change particular values in the binary representation of the offset thereby causing a bitwise operation equivalent to division to be performed. This operation may enable determination of chunk information associated with the particular offset. In utilizing the bit mask 304, the admissions controller or other component of the storage server may cause one or more bits in a byte, bit string, or other binary data to be set either on, off, or inverted from on to off (or vice versa) in a single bitwise operation. The bitwise operation operates on one or more bit patterns, binary numerals, or other binary data at the level of the individual bits. The bitwise operation may be a fast operation directly supported by the processor, and may be used to manipulate values for comparisons and calculations. On simple low-cost processors, such the on-board processor described in greater detail below, typically, bitwise operations are substantially faster than division, several times faster than multiplication, and sometimes significantly faster than addition. While modern processors may perform addition and multiplication just as fast as bitwise operations due to their longer instruction pipelines and other architectural design choices, bitwise operations do commonly use less power because of the reduced use of resources.

As illustrated by FIG. 3, the storage server may store the bit mask 304 and perform a logical and between the bit mask 304 and the offset 306 as described above. The result of the operation may be the equivalent of integer division and may indicate the chunk 308 associated with the offset 306. In various embodiments, the bit mask 304 is not stored by the storage server and is calculated based at least in part on the chunk size prior to performing the bitwise operation and determining the chunk 308 associated with the offset 306. When two or more offsets 306 map to the same chunk 308 the work requests corresponding to the offset 306 may be considered sequential. In some embodiments, a bit shift operation is be performed to determine the chunk 308 associated with the offset 306. In such embodiments, the information is encoded as bits (e.g., encoded as powers of two in a binary representation) and division is performed by shifting a number of bits to the right. For example, a chunk size of 1 Mb equates to two to the power of twenty ($2^{20}$), therefore dividing the offset 306 by the chunk size may be accomplished by shifting the bits of the offset 306 to the right 20 places.

Figure 4:
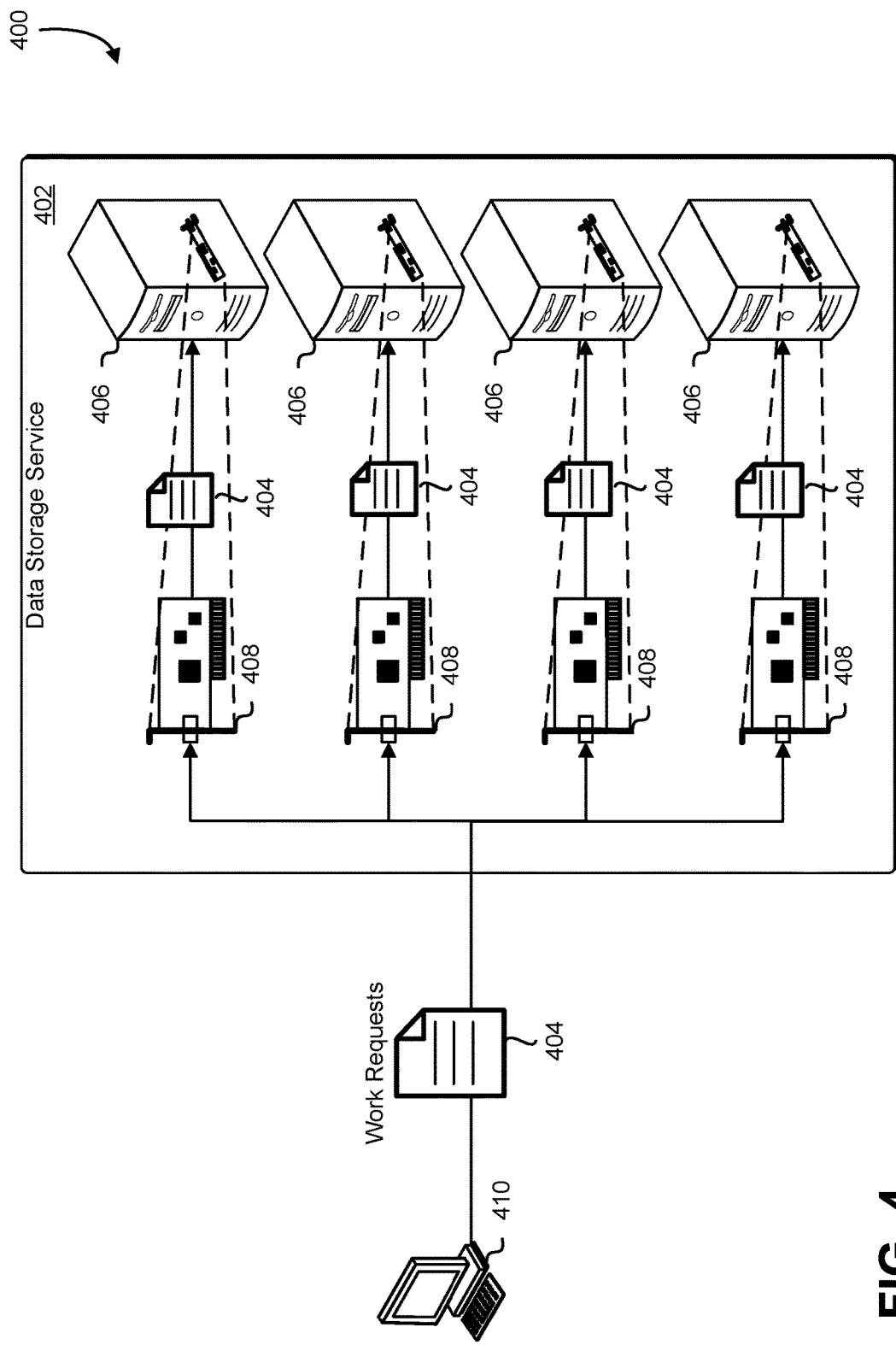
FIG. 4 illustrates an environment in which remote storage servers may detect sequential work requests in accordance with at least one embodiment.

FIG. 4 illustrates an aspect of an environment 400 in which an embodiment of the present disclosure may be practiced. As illustrated in FIG. 4, the environment 400 may include a data storage service 402 including a plurality of data storage servers 406 having a network interface controller 408 of the present disclosure, wherein customers 410 of the data storage service 402 may transmit work requests 404 to the data storage servers 408, which are routed to each network interface controller 408 by a router or other network device. The customer 410 may include a computer system operated by a user or other individual. The data storage service 402 may be a data center of a computing resource service provider hosting a plurality of data storage servers 406 of various types as depicted in the environment 500 of FIG. 5.

The plurality of data storage servers 408, in various embodiments, may be configured to host a network interface controller 408 including an on-board processor described in greater detail below. Note that more than one network interface controllers 408 may be present within any of the plurality of the data storage servers 408. Examples of such data storage servers 408 include data servers and other servers including, but not limited to web servers and application servers. As noted, the network interface controller 408 may include an on-board processor, examples of which include, but are not limited to, a microprocessor, a co-processor, a micro-controller, a microcomputer, a central processing unit, a graphics processing unit, or a programmable logic device.

To meet the demands required for processing a large number of work requests 404, including I/O requests, without significantly impacting performance of the data storage servers 408 the on-board processor, of the network interface controller 408, may perform certain operations on behalf of the data storage servers 408. The on-board processor may be any suitable processing device, such as one or more of a microprocessor, a co-processor, a micro-controller, a microcomputer, a central processing unit, a graphics processing unit, application specific integrated circuit (ASIC), custom reduced instruction set computing (RISC) chip or some other programmable logic device. Examples of such processing devices include, but are not limited to, devices based on an Intel x86 architecture, an Itanium architecture, a reduced instruction set (RISC) architecture (including ARM, Power Architecture and Blackfin architectures), and a SPARC architecture.

The on-board processors may be integrated with the network interface controller 408 or other component of the data storage servers 408. Work request 404 may be received by the on-board processors at the network interface or may be pushed or otherwise provided to the on-board processors by the data storage servers 408. The on-board processors may execute software or other executable code to determine whether two or more I/O request are sequential based at least in part on a chunk associated with the requests. For example, the executable code may be located in on-board random access memory (RAM), read-only memory (ROM), or firmware, and the on-board processor may inspect incoming I/O requests to determine an offset and calculate chunk information based at least in part on the offset. A technical advantage achieved by detecting sequential I/O operations by the on-board processors of a server computer system is that it reduces the resource utilization of the data storage servers 408 and eliminates the need for a central processing server computer system; e.g., by performing the determination of sequential requests and throttling at the target server computer system, valuable space within a data center that would have been used for servers or other devices dedicated to throttling and access control may be used for other purposes. In addition, the on-board processors may store information corresponding to the last chunk or chunks associated with one or more previous requests and the current size of the merged sequential requests.

Figure 5:
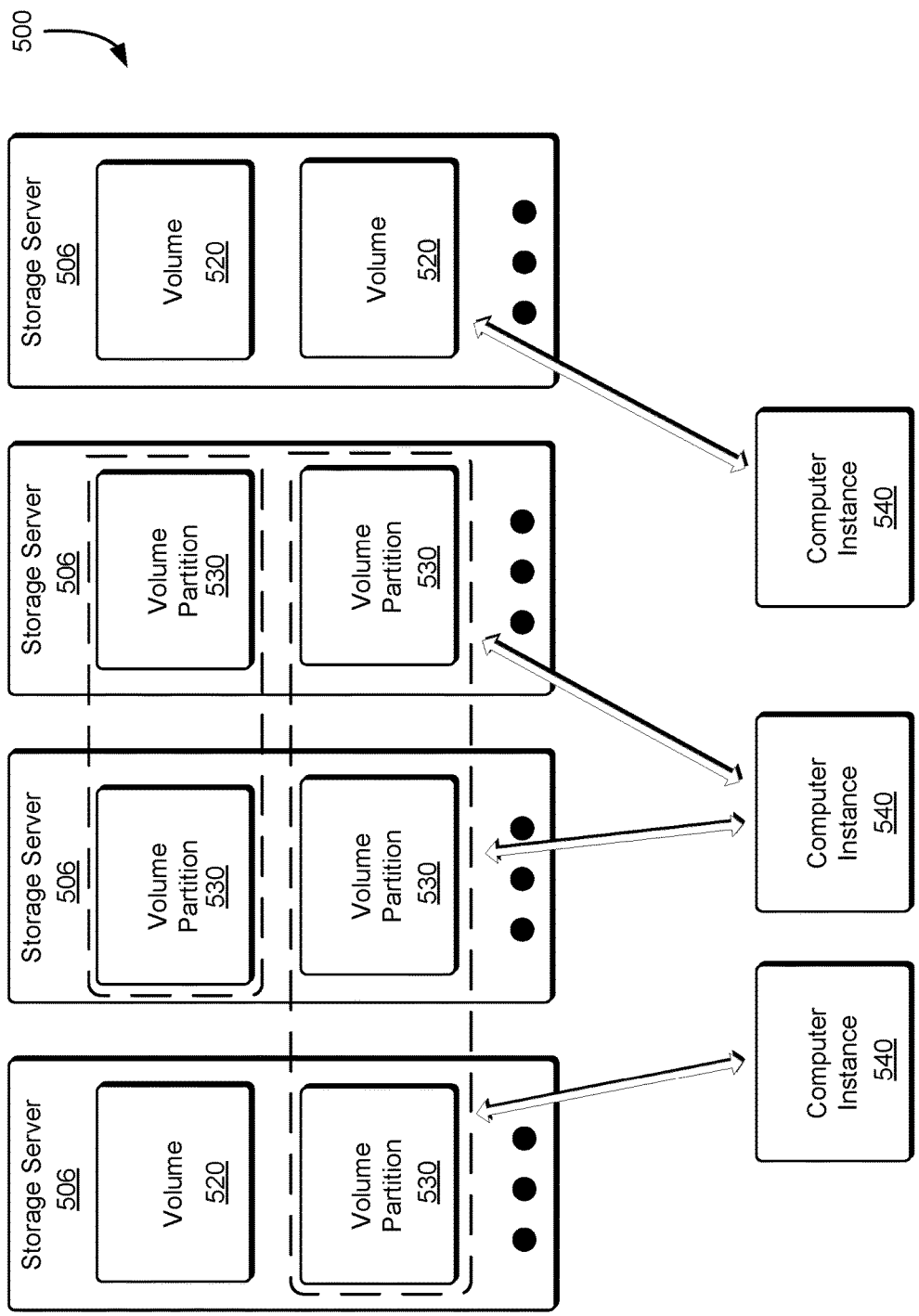
FIG. 5 illustrates an environment in which various aspects of admissions control-related operations for block-level devices that are attachable to one or more computer instances may be implemented in accordance with at least one embodiment.

FIG. 5 illustrates an environment 500 in which various aspects of admissions control-related operations for block-level devices that are attachable to one or more computer instances 540 may be implemented, according to at least one embodiment. Four storage servers 506 are shown in FIG. 5. A partitioned volume 530 is illustrated, with three partitions, while three non-partitioned volumes 520 are shown. In some embodiments in which partitioned volumes are supported, non-partitioned volumes may simply be managed as volumes that each comprise a single partition. Both partitioned and non-partitioned volumes may be attached to multiple computer instances 540 in the depicted embodiment, e.g., as a result of various "AttachVolume" service calls. Partitioned volume 530 may be attached to multiple computer instances 540, while non-partitioned volume 520 may be attached to a single computer instance 540. A given computer instance 540 may be attached to more than one multiply-attached volume (such as 530) in at least some embodiments.

The computing resource service provider may provide customers with the ability to attach a given volume partition or volume to several different computer instances 540, each of which could potentially be executing at a different instance host. In some embodiments in which multiple attachments are supported, a client-side component of the different instance hosts involved (i.e., the different instance hosts at which the concurrently-attached instances are running) may exchange workload information for each of the attached instances. In other embodiments, the storage servers 506 involved in implementing the multiply-attached volumes may collect workload information to be used for admissions control decisions. For example, a storage server 506 may collect I/O information of the multiply-attached volume 530 for use in admissions control decision, for example, detecting sequential work requests. In some embodiments, the storage servers 506 may be able to isolate the workload metrics for different computer instances 540 that are attached to the same volume or partition, and use the metrics in various admissions control determinations, such as removing work tokens from a token bucket for sequential workload as described above.

In the embodiment illustrated in FIG. 5, the data storage service may track sequence information associated with received work requests. In these embodiments, sequential work requests may be charged a reduced amount of tokens enabling the customer to utilize additional computing resources of the data storage service to complete the work requests. For example, a work request to obtain a large data object from the data storage service may include a set of sequential I/O requests. For each I/O request in the sequence up to a certain size or certain number a reduced token value may be charged. The work requests received by the storage servers 506 may include sequence information.

The sequence information may include information corresponding to a I/O stream being monitored for sequence information, an offset (e.g., an offset of a logical volume or volume partition), a length (e.g., for a read operation the length may be a number of bytes from the offset the data storage service is to return), and a reduced number of tokens to be charged (e.g., a maximum length of requests that will be merged and/or combined by the storage server 506 for the purposes of consuming tokens). This information may be maintained in memory of the storage server 506 or on-board processors, as described above. Additionally, at least a portion of this information may be determined dynamically. For example, the reduced token cost may be determined dynamically as work requests are received, e.g., the fourth work request in a sequence may be charged a fewer number of tokens than the third work request in a sequence. Once a sequence of requests has reached a particular size a full token may be charged.

Figure 6:
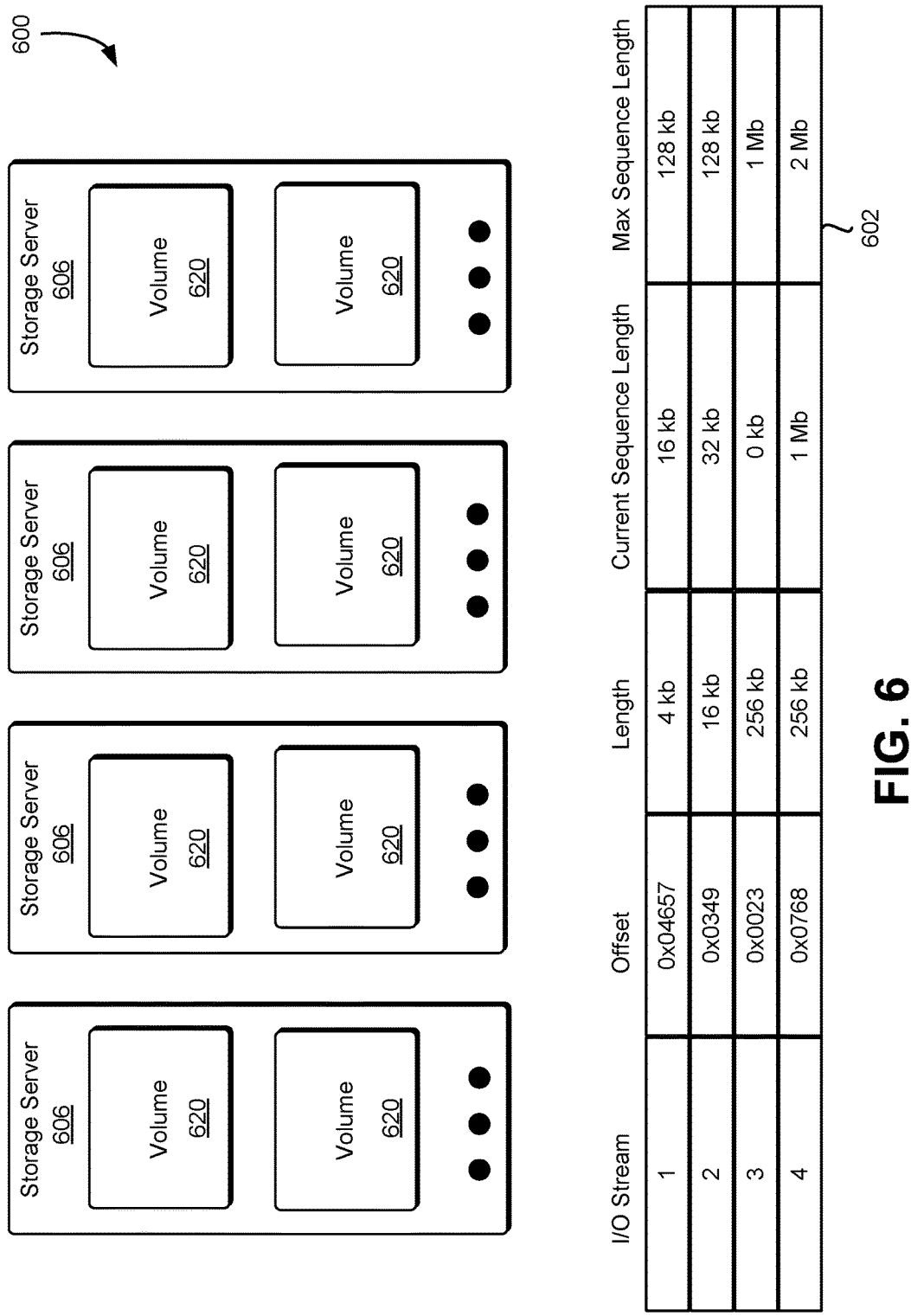
FIG. 6 illustrates an environment in which various aspects of admissions control-related operations, such as sequential work request detection, for block-level devices that are attachable to one or more computer instances may be implemented, according to at least one embodiment.

FIG. 6 illustrates an environment 600 in which various aspects of tracking sequential work requests for determining a number of tokens to consume for a set of sequential work requests by an admissions controller of a service, such as a data storage service, may be implemented according to at least one embodiment. As illustrated by FIG. 6, a plurality of data storage servers 606 may operate a set of volumes 620 as described above. The data storage servers 606 or component thereof may track one or more I/O streams labeled I/O streams 1, 2, 3, and 4 in FIG. 6 for illustrative purposes only. In various embodiments, the I/O streams are tracked based at least in part on information included in the work request such as the offset. Furthermore, although FIG. 6 illustrates tracking sequential work requests specifying I/O operations various other work requests including the allocation of other types of computing resources, such as processing or memory capacity, are considered within the scope of the present disclosure.

Returning to FIG. 6, the data storage service may receive an I/O work request, at an interface as described above, and the I/O work request may include information identifying a volume 620, an offset, and a length. The interface may determine a data storage server associated with the volume and/or offset (e.g., if the volume in partition across a plurality of data storage servers). Additionally, the interface may also determine an I/O stream associated with the request for the purposes of determining if the work request is a member of a sequence currently being tracked. In various embodiments, the interface merely determines a data storage server capable of processing the work request and transmits the work request to the data storage server where the data storage server 606, determined in the work request, is a member of a sequence currently tracked by the data storage server 606.

The data storage server 606 or component thereof may track a certain number of I/O streams so as not to exhaust the entirety of the memory available to the data storage server 606 or data storage service. For example, the data storage service may track the last 16 recently received I/O streams. An I/O stream may be two or more I/O requests which are in sequence, e.g., requests to interact with data that is in two or more blocks of a logical volume or block-level storage device that are next to each other. If an I/O work request is received and the data storage server determines, based at least in part on the offset, that the I/O work request is not in sequence with a currently tracked I/O stream, the data storage service may attempt to add the I/O work request to the set of streams currently tracked by the data storage server. Adding the I/O work request to the set of streams currently tracked by the data storage server may include determining the I/O stream for which an I/O work request was least recently used and replacing admissions data 602 with the I/O work request.

The admissions data 602 may include information corresponding to the I/O streams such as offset of the last received request, length of the last received request, current length of the sequential work requests being tracked, and a maximum sequence length that will be merged for a certain number of tokes. A particular I/O work request may be considered in sequence as a result of the offset included in the work request corresponding to an offset currently being tracked in the admissions data 602 in a particular stream. In various embodiments, other data such as an I/O stream identifier may be used to determine that a particular I/O work request is a member of a sequence of I/O work requests currently being tracked in the admissions data 602.

As a result of determining that the particular I/O work request is a member of a set of I/O work requests currently being tracked, the data storage service, data storage server 606, or component thereof may update the admissions data 602 with information obtained from the particular I/O work request. For example, data storage service or component thereof, such as the admissions controller, may obtain a length of the second I/O request and add the length to the length currently recorded for the I/O stream. The data storage service may then determine a reduced number of tokens to charge the burst token bucket associated with the I/O request. The reduced number of tokens may only be charged if there is sufficient capacity in a work token bucket. In some embodiments, for any particular I/O stream once the current sequence length tracked by the data storage server 606 reaches or exceeds the max sequence length a token is removed from the work token bucket. In yet other embodiments, the token is removed on processing of the first work request in the I/O stream and then no more tokens are removed until after the max sequence length is reached. In addition to the forgoing, various different throttling mechanisms may be used in connection with the sequential work load detection described herein.

Figure 7:
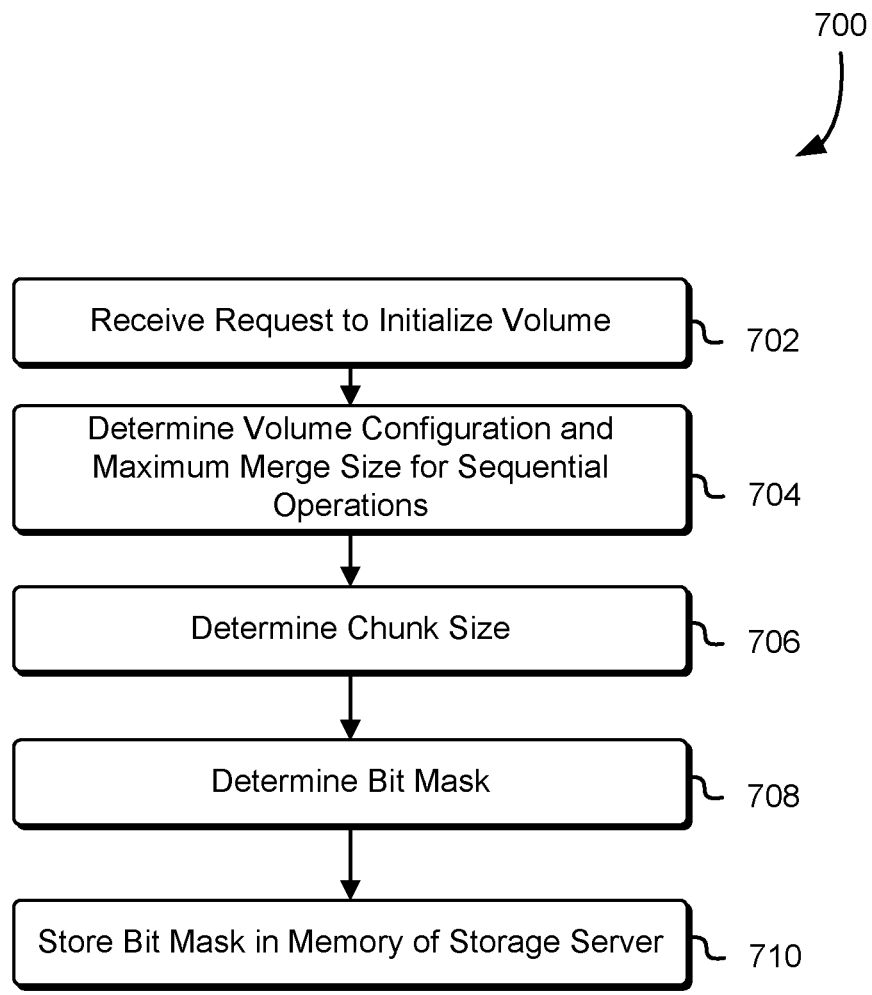
FIG. 7 illustrates a process which may be used to generate a bit mask suitable for determining sequential work requests based at least in part on chunk information in accordance with an embodiment.

FIG. 7 shows an illustrative process 700 which may be used to generate a bit mask suitable for determining a chunk associated with a work request in order to detect sequential work requests in accordance with at least one embodiment. The process 700 may be performed by any suitable system such as the admissions controller described above in FIG. 1 or any combination of systems or components thereof such as the data storage service described above in FIG. 4. Returning to FIG. 7, in an embodiment, the process 700 includes receiving a request to initialize a volume 702. The request may include an identity of the requestor, a size of the request volume, a location or data center the volume is to be initialized in, a number of partitions in the volume, or any additional information usable by a data storage service to created and initialized as volume on behalf of a customer of the data storage service. The request may be received at an interface of the data storage service and directed to the appropriate data storage server or the request may be received directly by the data storage server.

The data storage server or other component of the data storage service may then determine the volume configuration and a maximum merge size for sequential operations 704. The maximum merge size for sequential operations may be determined by the data storage service and may be based at least in part on the performance parameters of the data storage servers. For example, it may more efficient for a particular block level storage device to process sequential I/O requests up to 2 Mb rather than random I/O request of 1 Mb or smaller. Therefore, the computing resource service provider may determine to modify and/or implement a throttling mechanism which provides incentives or otherwise enables users to utilize more resources when submitting sequential work requests up to 2 Mb. The volume configuration information may include the total size of the volume, the maximum queue size supported by the volume and/or data storage server, and other any information associated with the volume that is suitable for determining the chunk size or the bit mask. For example, the chunk size may be multiplied by the queue depth in order to improve the approximation of sequential work requests by at least increasing the size of the chunks and the likelihood of two or more work requests hitting the same chunk.

The storage server may then determine the chunk size 706. The storage server may determine the chunk size based at least in part on the maximum merge size and the volume configuration information. The volume size divided by the chunk size may provide the storage server with a mapping of the volume sectors to the logical chunks used for determining if two or more work requests are sequential. The chunk size may be modified based at least in part on a variety of different performance characteristics of the volume and/or data storage servers. In various embodiments, metrics data generated by the data storage service is collects and analyzed in order to determine a modified chunk size. For example, the metrics information for a particular volume may be analyzed in order to determine if the chink size should be modified in order to capture additional sequential work requests that may not have been detected. The analysis may reveal if sequential work requests are not detected based at least in part on two or more sequential work requests being mapped to two or more different logical chunks of the volume as a result of the chunk size being too small.

The storage server may then determine a bit mask associated with the logical chunks of the volume 708. The bit mask may be configured such that application of the bit mask to a bit string representing the offset included in a work requests cause a bitwise operation equivalent to integer division to be performed. The bit mask may be a string of bits set such that the storage server may apply the bit mask to a string of bits and obtain a result. The bit mask may provide a more efficient operation than division for certain types of processors or computer systems. The bit mask may then be stored in memory of the storage server 710. The bit mask may be stored such that when a work load request is received by the data storage server, the bit mask may be obtained from memory and utilized to determine a logical chunk of the volume associated with the work request. In several variations of the process 700, the bit mask may not be stored in memory of the storage server and may be calculated every time as work request is received by the storage server.

Figure 8:
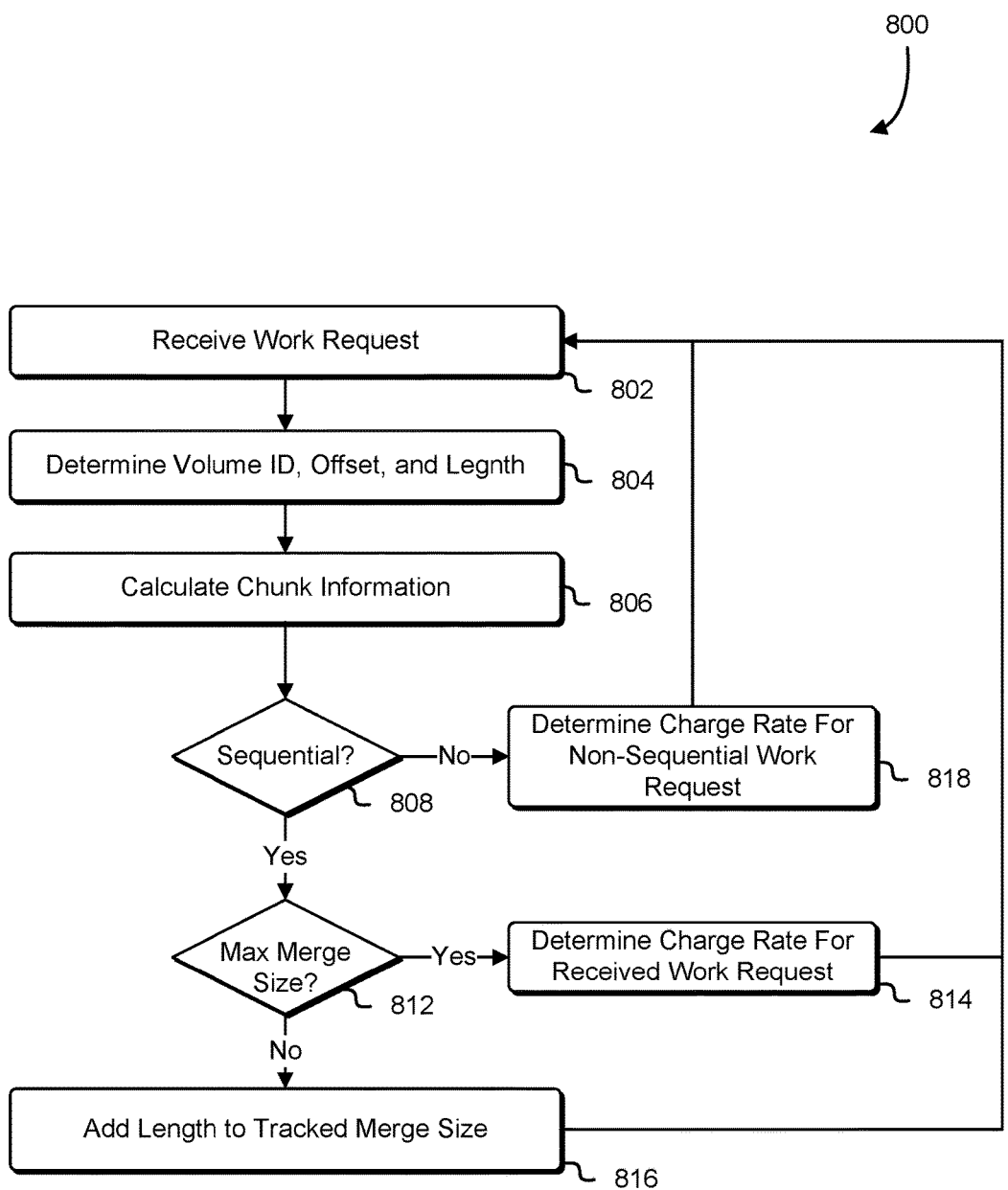
FIG. 8 shows an illustrative process which may be used to determine a reduced number of work tokens to charge for sequential work requests in accordance with at least one embodiment.

FIG. 8 shows an illustrative process 800 which may be used to determine a reduced number of work tokens to charge for sequential work request in accordance with at least one embodiment. The process 800 may be performed by any suitable system such as the admissions controller described above in FIG. 1 or any combination of systems or components thereof such as the data storage service described above in FIG. 4. Returning to FIG. 8, in an embodiment, the process 800 includes receiving a work request 802. The work request may be a request to perform an I/O operation as described above or may be any operation that requires an allocation of computing resources to an operation to be performed by the computing resources. After receiving the work request, the admissions controller or other system executing process 800 may determine a volume ID, offset, and length included in the work request 804 or any other information associated with the work request that may be useable for determining a logical chunk of the volume associated with the work request.

The data storage service may then calculate the chunk information 806. For example, if the offset obtained from the received work requests when divided by the chunk size matched a previous logical chunk of the volume hit stored in the admissions data the received work request may be considered in sequence with a previously received work request. In another example, a bit mask, as described above, may be used to determine if the offset maps to the same logical chunk of the volume as a logical chunk of the volume previously detected and/or stored in the admissions data. If the received work request is in sequence 808, the data storage service may determine if the maximum merge size has been reached 812. As described above, detecting if the maximum merge size has been reached may include updating the admissions data by at least adding the length obtained from the work request to a current sequence length recorded in the admissions data. In numerous variations to process 800, updating the table entry may include incrementing a counter corresponding to a set of sequential work requests. Furthermore, there may be additional requirements for a request to be considered sequential. For example, there may be a minimum average size for the requests in order for a particular request to be considered sequential. In numerous variations to the process 800, the data storage service or component thereof such as the admission controller may scan the admissions data for a variety of different patterns other than sequential work requests. The variety of different patterns may include, for instance, clustered work requests, time variant work requests (e.g., sending multiple requests at the same time or spacing out multiple requests over a longer interval of time), device dependent patterns, or any other pattern or method of submitting work requests that may reduce the load on the computer system processing the request.

Returning to FIG. 8, if the work request is not in sequence with at least one other work request currently being tracked in the admissions data, the data storage service may determine a charge rate for non-sequential (e.g., random) work requests 818. For example, the charge rate may indicate a number of tokens to remove from a work bucket based at least in part on a size and/or length associated with the work request. In another example, the charge rate may be set per requests (e.g., 1 work requests equals 1 token). Various other mechanism for determining a charge rate for the work request may be utilized in connection with the present disclosure. In variations of the process 800, the data storage service may perform no additional action and may continue to receive work requests. For example, if the user has already been throttled or if throttling of the work request is performed by a different system or at a different point. In yet other variations to the process 800, the storage server may be configured to track multiple I/O streams and may, if the work request is not sequential, may store the chunk information in memory for processing additional received work requests to determine if one or more of the additionally received work requests are sequential work requests relative to the work request. As described above, the number of sequential work requests tracked in the admissions data may be limited to preserve computing resources of the data storage server.

If there is additional space allocated to the admissions data, the data storage service may add information obtained from the work request to the admissions data. The information may be suitable for tracking the work request and determining if another work request received is in sequence with the work requests tracked in the admissions data. If there is not sufficient memory allocated to the admissions data to add the information obtained from the work request, the data storage server may determine the least recently used chunk information associated with a work request in the admissions data to be overwritten with information corresponding to the received work request. If the maximum merge size has been reached 812, then the storage server may determine a charge rate for the received work request 814. The charge rate for the received work request may be a reduced amount and/or reduced token value based at least in part on the received work request being a sequential work request. The reduced token value may be fixed for each work request in the sequence or may be dynamically determined based at least in part on various attributes of the work request sequence.

Additionally, the reduced token value may only be charged for a certain number of sequential work requests or for a certain amount of computing resources utilized to process the work requests. For example, the reduced token value may only be charged for every 20 work requests in a sequence at which point a full token may be charged to the burst token bucket. The 20 work requests may be fixed or may be based on computing resources utilized, such as a number of kbs read by the data storage service, in order to process the work requests in the sequence. Furthermore, the reduced charge rate for the received work request may be determined based at least in part on one or more policies of the data storage service. For example, the data storage service may offer different customers different levels of performance and may determine a reduced charge rate for the received work request based at least in part on a policy to provide a specific level of performance to the customer associated with the work request or other customer of the data storage service. If the maximum merge size 812 has not been reached, the data storage server may then add the length the current length of the tracked sequential work request 816 as described above. The data storage server may then continue to receive work request and execute the process 800.

Figure 9:
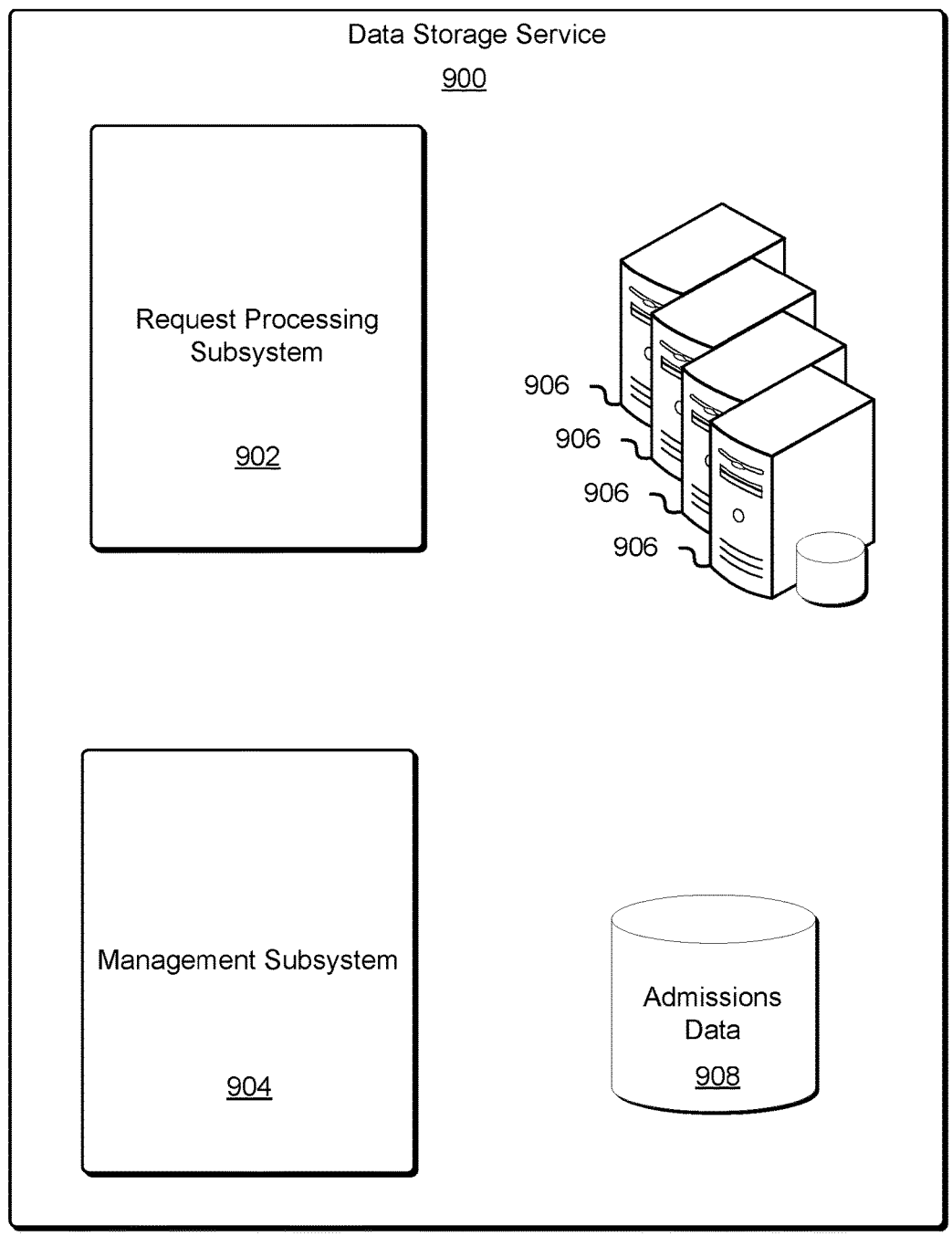
FIG. 9 illustrates example of a data storage service in accordance with at least one embodiment.

FIG. 9 shows an illustrative example of a data storage service in accordance with at least one embodiment. The data storage service 900 may be a service of a computing resource provider used to operate a block-level data storage service such as described above in connection with FIGS. 1 and 4. As illustrated in FIG. 9, the data storage service 900 includes various subsystems such as a request processing subsystem 902 and a management subsystem 904. The data storage service 900 may also include a plurality of data storage servers 906 and an admissions data 908, which may store data about various work token buckets, bit masks, and chunk information associated with volumes maintained by the data storage servers 906 as described above. In an embodiment, the request processing subsystem 902 is a collection of computing resources, such as webservers and application servers, collectively configured to as process requests submitted to the data storage service 900. The request processing subsystem 902, for example, may include one or more webservers that provide a web service interface to enable customers of the data storage service 900 to submit requests to be processed by the data storage service 900. The request may include work requests as described above in connection with FIG. 1. The request processing subsystem 902 may include computer systems configured to make various determinations in connection with the processing of requests, such as whether policy allows fulfillment of a request, whether requests are authentic (e.g., electronically signed using a suitable cryptographic key) and otherwise. In various embodiments, the request processing subsystem 902 may include an admissions controller as described above.

Components of the request processing subsystem may interact with other components of the data storage service 900 (e.g., through network communications). For example, some requests submitted to the request processing subsystem 902 may involve the management of computing resources which may include data objects stored by the data storage servers 906. The request processing subsystem 902, for example, may receive and process requests to modify computing resources. For instance, in some examples, data objects are logically organized into logical data containers. Data objects associated with a logical data container may, for example, be said to be in the logical data container. Requests to the data processing subsystem 902 may include requests for creating logical data containers, deleting logical data containers, providing an inventory of a logical data container, providing or updating access control policy with respect to one or more logical data containers and the like.

The requests may be processed by the management subsystem 904 upon receipt by the request processing subsystem 902. If applicable, various requests processed by the request processing subsystem 902 and/or management subsystem 904 may result in the management subsystem 904 updating metadata associated with data objects and logical data containers stored in a metadata store. Additionally, the management subsystem may include an admissions controller which may update the admissions data 908, described in greater detail below. Other requests that may be processed by the request processing subsystem 902 include requests to perform operations in connection with data objects. The requests, for example, may include requests to upload data objects to the data storage service 900, to download data objects from the data storage service 900, to delete data objects stored by the data storage service 900 and/or other operations that may be performed.

Requests processed by the request processing subsystem 902 that involve operations on data objects (upload, download, delete, e.g.) may include interactions between the request processing subsystem 902 and one or more data storage servers 906. The data storage servers 906 may be computer systems communicatively coupled with one or more storage devices for the persistence of data objects. For example, in order to process a request to upload a data object, the request processing subsystem may transmit data to a data storage server 906 for persistent storage. It is noted, however, that in some embodiments, client (e.g., customer) computer systems may transmit data directly to the data storage servers 906 instead of through servers in the request processing subsystem.

In some embodiments, the request processing subsystem 902 transmits data to multiple data storage servers 906 for the purposes of redundantly storing the data to allow the retrievability of data in the event of failure of an individual data storage server 906 and/or associated data storage device. For example, in some embodiments, the request processing subsystem uses a redundancy in coding scheme such as erasure coding to deconstruct a data object into multiple parts that are stored among the data storage servers 906. The parts may be configured such that if access to a certain number of parts is lost, the data object may nevertheless be reconstructible from the remaining parts that remain accessible.

To enable efficient transfer of data between the request processing subsystem 902 and the data storage servers 906 and/or generally to enable quick processing of requests, the request processing subsystem 902 may include one or more databases that enable the location of data among the data storage servers 906. For example, the request processing subsystem 902 may operate a key value store that serves to associate identifiers of data objects with locations among the data storage servers 906 for accessing data of the data objects.

The admissions data 908 may include information corresponding to the work token buckets, bit masks, chunk size, and other information corresponding the logical chunks of the volume for the various volumes managed by the data storage service 900 and global work token buckets for the data storage service 906. Additionally, the admissions data may contain information corresponding to the received requests, such as information about sequential I/O operations included in various received requests. Returning to FIG. 9, the admissions data 908 may contain data structures, as described above, containing information indicating a number of tokens in a particular bucket, chunk information, or other information as described above.

Figure 10:
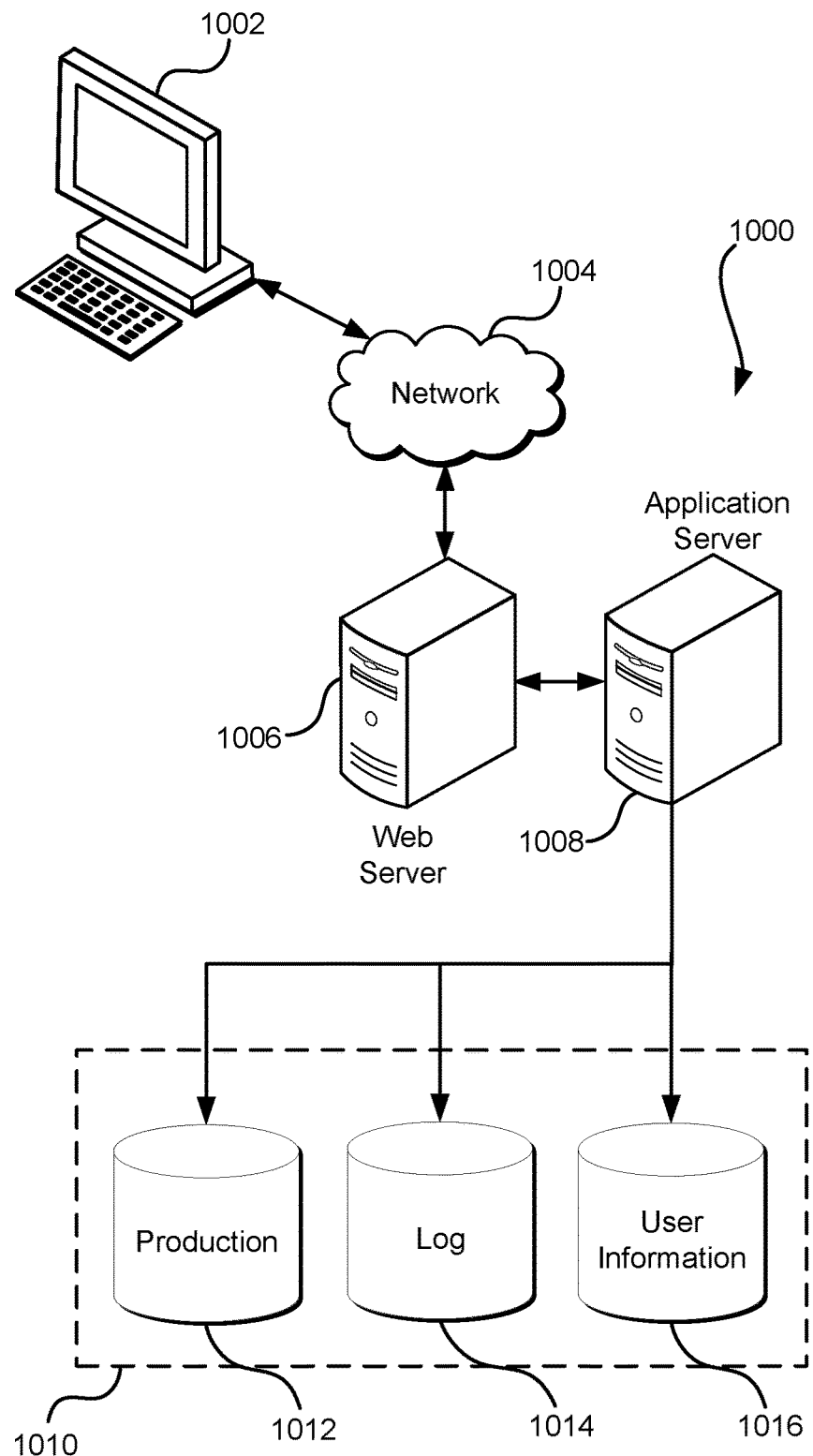
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages, or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 1002 and the application server 1008, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    initializing a logical volume with a total capacity of the logical volume and a maximum merge size for the logical volume, where the maximum merge size indicates a length associated with one or more input/output (I/O) operations that may be merged to determine a number of tokens associated with the one or more I/O operations, by at least generating a logical mapping of sectors of the logical volume to one or more logical chunks by at least dividing the logical volumes into the one or more logical chunks based at least in part on the maximum merge size of the logical volume;
    receiving a first work request specifying a first I/O operation;
    determining a first logical chunk associated with the first I/O operation based at least in part on the logical mapping and first offset information associated with the first I/O operation;
    incrementing a current length of merged I/O operations by at least adding a first length associated with the first operation to the current length of merged I/O operations;
    determining a number of tokens associated with the first work request to be removed from a token bucket, where the number of tokens indicates an amount of computing resources utilized to complete the first I/O operation included the work request;
    receiving a second work request including a second I/O operation; and
    detecting that the second I/O operation included in the second work request is sequential to the first I/O operation by at least:
        determining a second logical chunk associated with the second I/O operation based at least in part on the logical mapping and a second offset information associated with the second I/O operation;

detecting that the second I/O operation included in the second work request is sequential to the first I/O operation as a result of the first logical chunk and the second logical chunk being equal; and incrementing the current length of merged I/O operations by at least adding a second length associated with the second operation to the current length of merged I/O operations.

2. The computer-implemented method of claim 1, wherein determining the first logical chunk associated with the first I/O operation further comprises dividing the first offset information by a chunk size, where the chunk size corresponds to a size of a logical chunk of the one or more logical chunks associated with the volume.

3. The computer-implemented method of claim 1, wherein the method further comprises removing a reduced number of tokens based at least in part on detecting tat the second I/O operation included in the second work request is sequential to the first I/O operation and the current length is not greater than the maximum merge size.

4. The computer-implemented method of claim 1, wherein the method further comprises:

receiving a third work request including a third I/O operation;

detecting that the third I/O operation included in the third work request is sequential to the second I/O operation by at least:

obtaining third offset information associated with the third I/O operation from the work request;

determining a third logical chunk associated with the third I/O operation based at least in part on the logical mapping and the third offset information associated with the third I/O operation;

detecting that the third I/O operation included in the third work request is sequential to the second I/O operation as a result of the second logical chunk and the third logical chunk being equal; and incrementing the current length of merged I/O operations by at least adding a third length associated with the third I/O operation to the current length; and removing the number of tokens from the token bucket as a result of the current length of merged I/O operations greater than or equal to the maximum merge size.

5. A system, comprising:
one or more processors; and
memory that includes instructions that, if executed by the one or more processors, cause the system to:
receive a work request;
determine that the work request is sequential to at least one other previous work request by at least:
obtaining an offset and a length of the work request;
determining a logical chunk associated with the offset matches at least one other logical chunk associated with the at least one other previous work request, where the logical chunk is associated with one or more locations of a volume; and
incrementing a current length by at least adding the length to the current length; and
remove a number of tokens from a token bucket as a result of the determination that the work request is sequential to the at least one other previous work request, where the number of tokens is less than a second number of tokens that would be removed by the system if the work request was not a sequential work request.

6. The system of claim 5, wherein the memory further includes instructions that, if executed by the one or more processors, cause the system to, as a result of receiving a request to create the volume, determine a chunk size based at least in part on the maximum merge size, where the chunk size is used by the system to calculate the logical chunk and the at least one other logical chunk.

7. The system of claim 6, wherein the memory further includes instructions that, if executed by the one or more processors, cause the system to modify the chunk size in order to improve accuracy in determining that the work request is sequential to the at least one other previous work request.

8. The system of claim 6, wherein the memory further includes instructions that, if executed by the one or more processors, cause the system to modify the chunk size by at least multiplying the chunk size by a queue depth associated with the system, where the queue depth indicates a number of work requests the system will maintain in a queue for processing.

9. The system of claim 6, wherein the memory further includes instructions that, if executed by the one or more processors, cause the system to modify the chunk size based at least in part on metrics information obtained from the system.

10. The system of claim 5, wherein the memory further includes instructions that, if executed by the one or more processors, cause the system to:
generate a bit mask configured to provide chunk information if applied to the offset, the bit mask generated based at least in part on a chunk size associated with the maximum merge size; and
calculate the logical chunk based at least in part on the offset and the bit mask.

11. The system of claim 5, wherein the memory further includes instructions that, if executed by the one or more processors, cause the system to track a set of logical chunks corresponding to the at least one other previous work request.

12. The system of claim 5, wherein the instructions that cause the system to determine the logical chunk associated with the offset matches the at least one other logical chunk further includes instructions that, if executed by the one or more processors, cause the system to shift the offset by a number of bits corresponding to a chunk size associated with the maximum merge size.

13. A non-transitory computer-readable storage medium having stored thereon executable instructions that, as a result of being executed by one or more processors of a computer system, cause the computer system to at least:
obtain an offset and a length of a work request;
modify a chunk size;
determine chunk information based at least in part on the offset and the chunk size, including generating a bit mask configured to determine the chunk information associated with the offset;
determine the chunk information associated with the offset matches at least some other chunk information associated with at least one other previous work request;
increment a current length by at least adding the length to the current length, where the current length indicates a total length of sequential operations that have been merged;
determine the current length is greater than or equal to a maximum merge size; and in response to the determining the current length is greater than or equal to a maximum merge size, perform a throttling operation if the current length is greater than or equal to a maximum merge size.

14. The non-transitory computer-readable storage medium of claim 13, wherein the instructions that cause the computer system to perform the throttling operation further include instructions that cause the computer system to remove a number of tokens from a token bucket to reduce an amount of computing resources that may be utilized by a customer.

15. The non-transitory computer-readable storage medium of claim 14, wherein the instructions that cause the computer system to remove the number of tokens from the token bucket further include instructions that cause the computer system to remove the number of tokens upon receiving a first work request of a sequence of work requests of which the work request is a member.

16. The non-transitory computer-readable storage medium of claim 14, wherein the instructions that cause the computer system to remove the number of tokens from the token bucket further include instructions that cause the computer system to remove the number of tokens upon receiving a last work request of a sequence of work requests of which the work request is a member.

17. The non-transitory computer-readable storage medium of claim 13, wherein the instructions further comprise instructions that, as a result of being executed by the one or more processors, cause the computer system to generate a mapping of a logical volume to a set of chunks of which the chunk information is a member and where the offset indicates a sector of the logical volume.

18. The non-transitory computer-readable storage medium of claim 17, wherein the instructions further comprise instructions that, as a result of being executed by the one or more processors, cause the computer system to track one or more previous chunks of the set of chunks in order to determine sequential work requests, where the one or more previous chunks corresponds to offset information obtained from one or more previous requests.

19. The non-transitory computer-readable storage medium of claim 13, wherein the instructions that cause the computer system to modify the chunk size further include instructions that cause the computer system to modify the chunk size based at least in part on a queue depth associated with the computer system, where the queue depth indicates a number of work requests the computer system will maintain in a queue for processing.

* * * * *